United States Patent

Bowden et al.

[15] 3,701,079

[45] Oct. 24, 1972

[54] INTERCONNECTING CARRIER BODIES FOR SEMICONDUCTOR DEVICES

[72] Inventors: James E. Bowden, 356 Silvertip Court, Milpitas, Calif. 95035; William L. Glick, 1731 Franck Avenue, Santa Clara, Calif. 95051

[22] Filed: July 10, 1970

[21] Appl. No.: 53,904

[52] U.S. Cl. ..........339/36, 339/17 CF, 339/176 MP, 220/23.4, 220/97, 206/65 F

[51] Int. Cl. ..........................H01r 13/60, B65d 21/02

[58] Field of Search..339/17 C, 17 CF, 17 L, 17 LM, 339/174, 176 MP, 36, 198 G, 198 H; 206/65 F, 65 K; 220/23.6, 97 R, 23.4

[56] References Cited

UNITED STATES PATENTS

| | | | |
|---|---|---|---|
| 3,537,061 | 10/1970 | Haag et al. | 339/183 |
| 3,424,334 | 1/1969 | Goltz | 20/23.6 |
| 3,441,853 | 4/1969 | Bodine | 324/158 |

*Primary Examiner*—Marvin A. Champion
*Assistant Examiner*—Lawrence J. Staab
*Attorney*—Eckhoff and Hoppe

[57] ABSTRACT

Carrier bodies for semiconductor devices, each carrier having first and second pairs of spaced surfaces, the first pair of surfaces being spaced apart and complementary to the second pair of surfaces so that the first pair of surfaces of one carrier body may be engaged with the second pair of surfaces on a second carrier body, whereby a plurality of carrier bodies may be assembled to form a stack.

5 Claims, 15 Drawing Figures

INVENTORS
JAMES E. BOWDEN
BY WILLIAM L. GLICK
Eckhoff and Hoppe
ATTORNEYS

INVENTORS
JAMES E. BOWDEN
WILLIAM L. GLICK
BY Eckhoff and Hoppe
ATTORNEYS

INVENTORS
JAMES E. BOWDEN
BY WILLIAM L. GLICK
Eckhoff and Hoppe
ATTORNEYS

INVENTORS
JAMES E. BOWDEN
BY WILLIAM L. GLICK
Eckhoff and Hoppe
ATTORNEYS

INVENTORS
JAMES E. BOWDEN
WILLIAM L. GLICK
BY Eckhoff and Hoppe
ATTORNEYS

INTERCONNECTING CARRIER BODIES FOR SEMICONDUCTOR DEVICES

This invention relates generally to carrier bodies for semiconductor device such as integrated circuit packages. More specifically, the invention involves a novel carrier body construction that allows a plurality of identical carrier bodies to be disconnectably assembled in a stack.

It is one object of the present invention to provide a carrier body of the kind described that may be assembled together for purposes of storage, dispensing and machine handling.

Another object is to provide carrier bodies of the kind described, each body having first and second pairs of spaced surfaces, one pair of surfaces being spaced apart and complementary to the other pair of surfaces so that one carrier body may be engaged with another and many carrier bodies may be assembled in a stack.

A still further object of this invention is to provide a carrier body of the kind described, each carrier body having complementary pairs of surfaces for engaging and being engaged by other carrier bodies, said surfaces being formed with parallel serrations that grip complementary surfaces of another carrier body.

Other objects of this invention will become apparent in view of the following detailed description and the accompanying drawings.

In the drawings forming a part of this application, and in which like parts are identified by like reference numerals throughout the same, FIG. 1 is a perspective view of dual in-line carrier bodies, each carrier body being constructed in the preferred manner contemplated by this invention that allows them to be disconnectably assembled;

Figure 4:
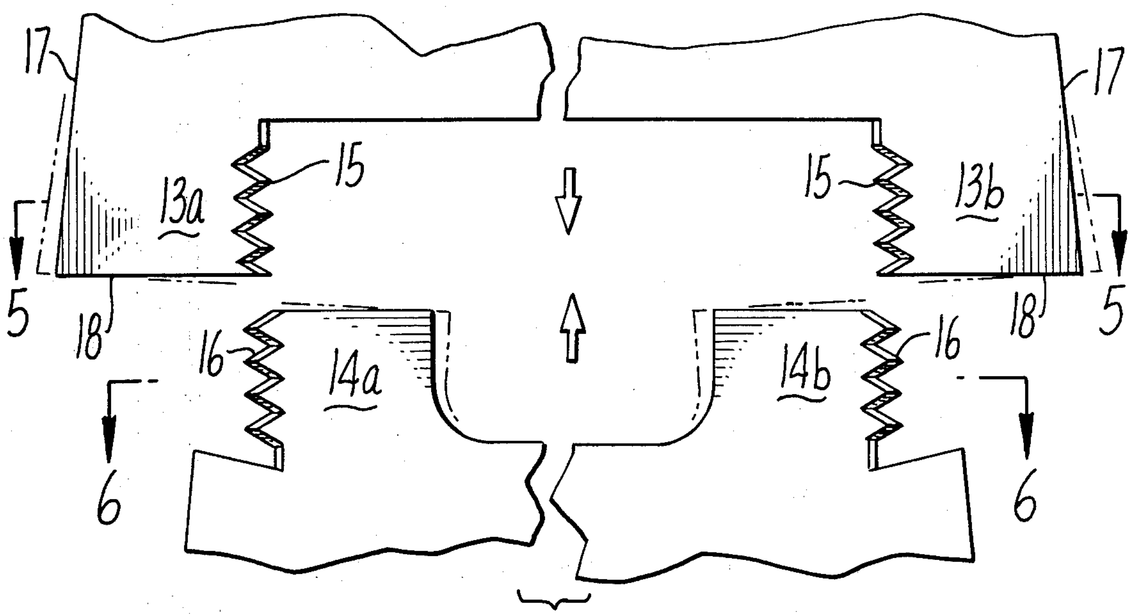
FIG. 4 is an enlarged detail of the interconnecting surfaces of two carrier bodies of the type shown in FIGS. 1—3.
Figure 5:
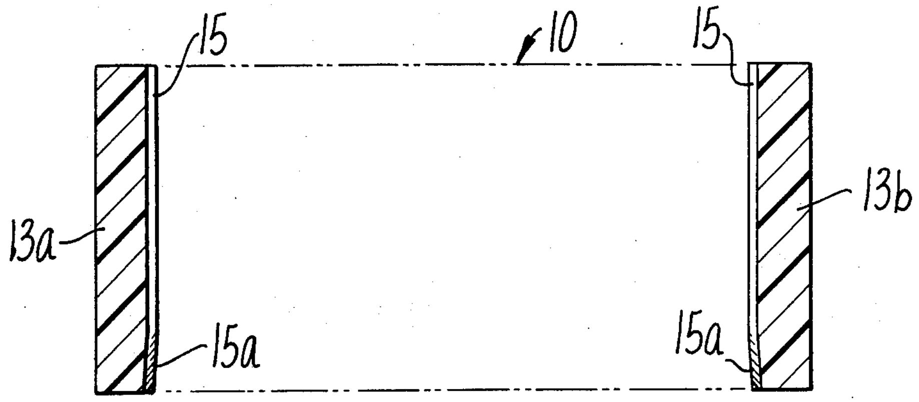
Figure 6:
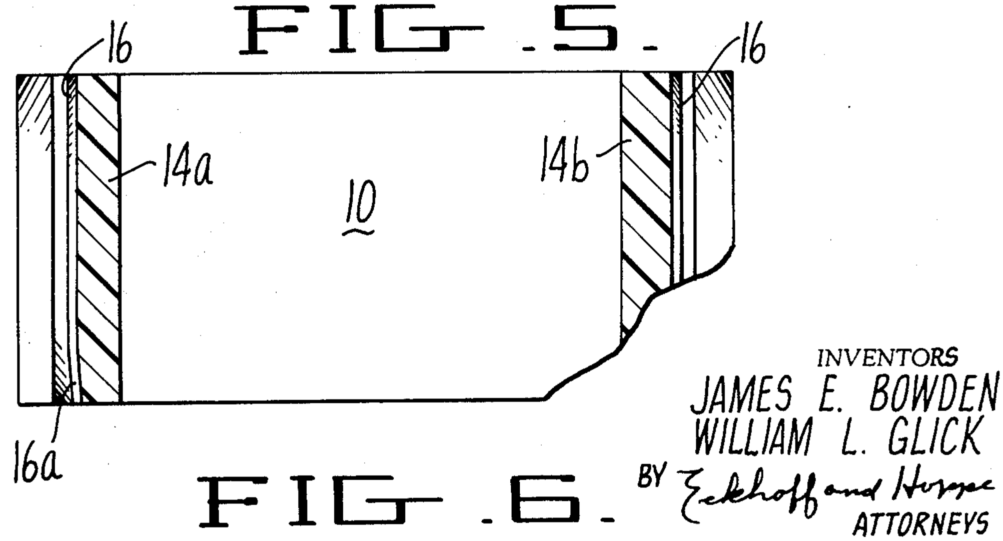
Figures 7, 8:
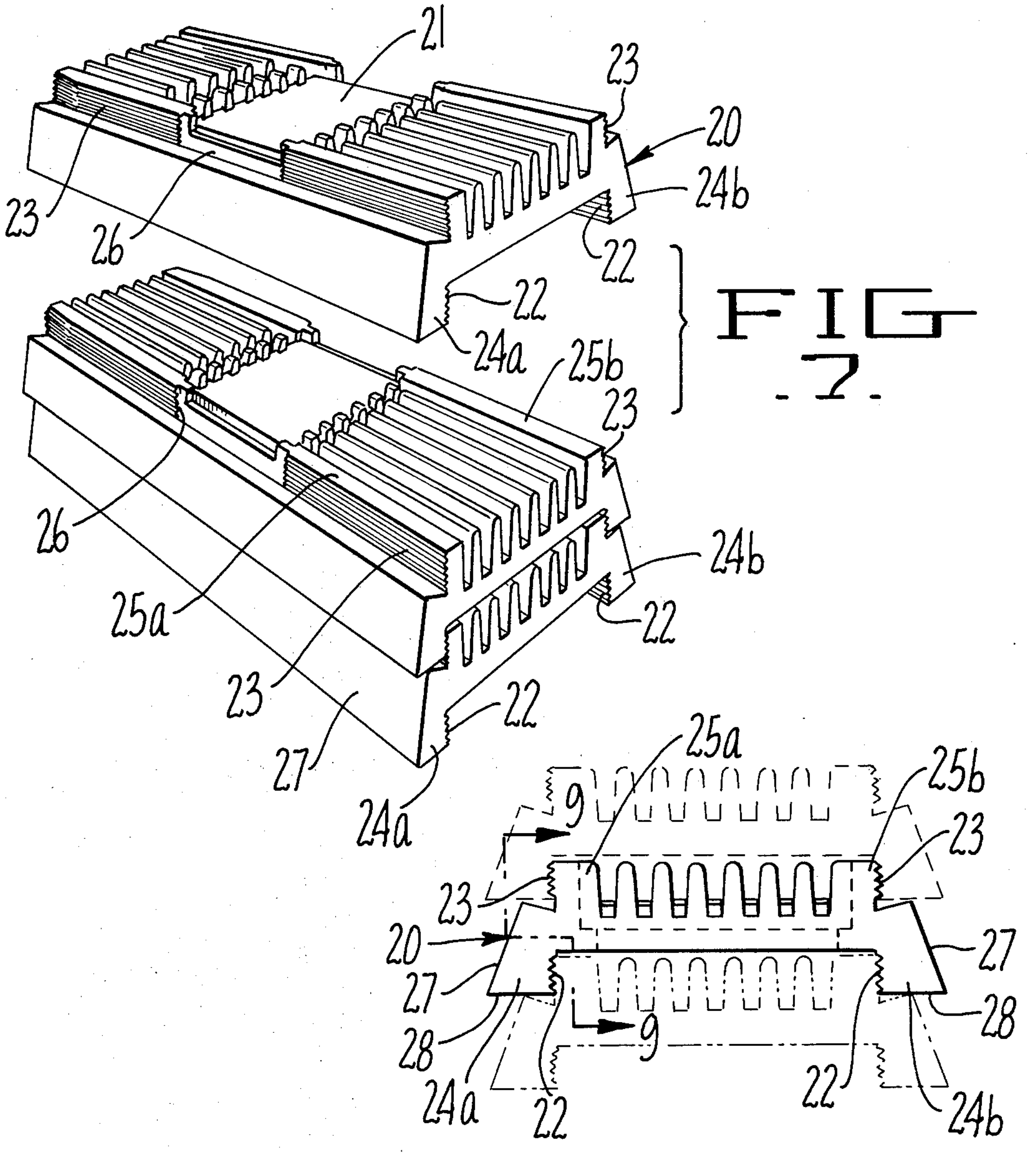
Figure 9:
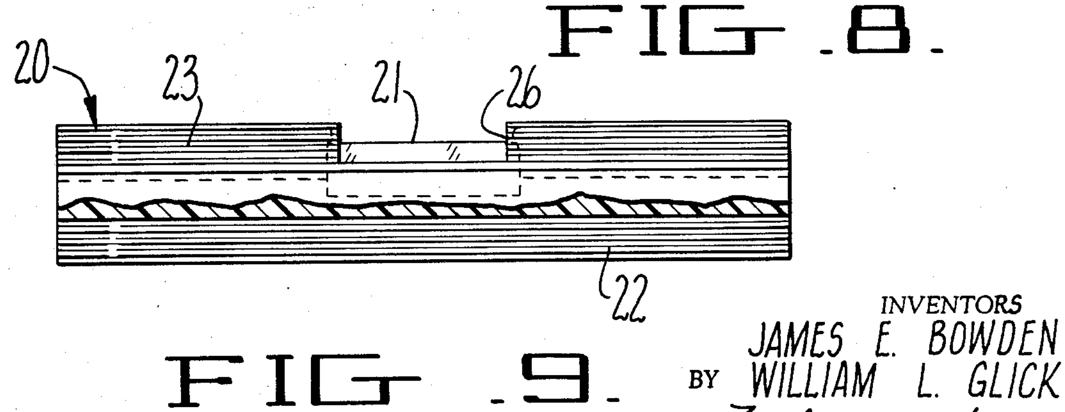
Figures 10, 11, 12:
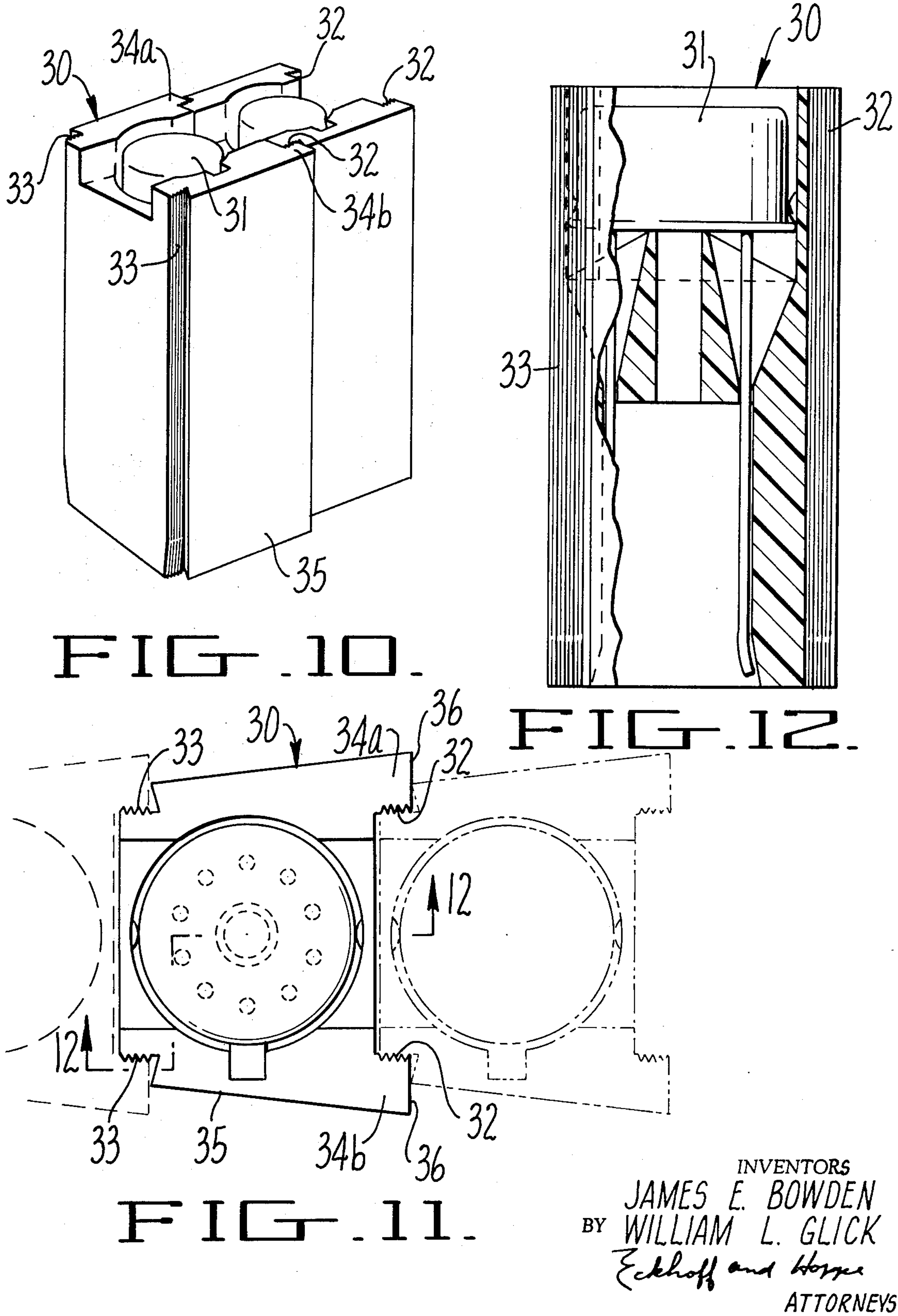
Figures 13, 14, 15:
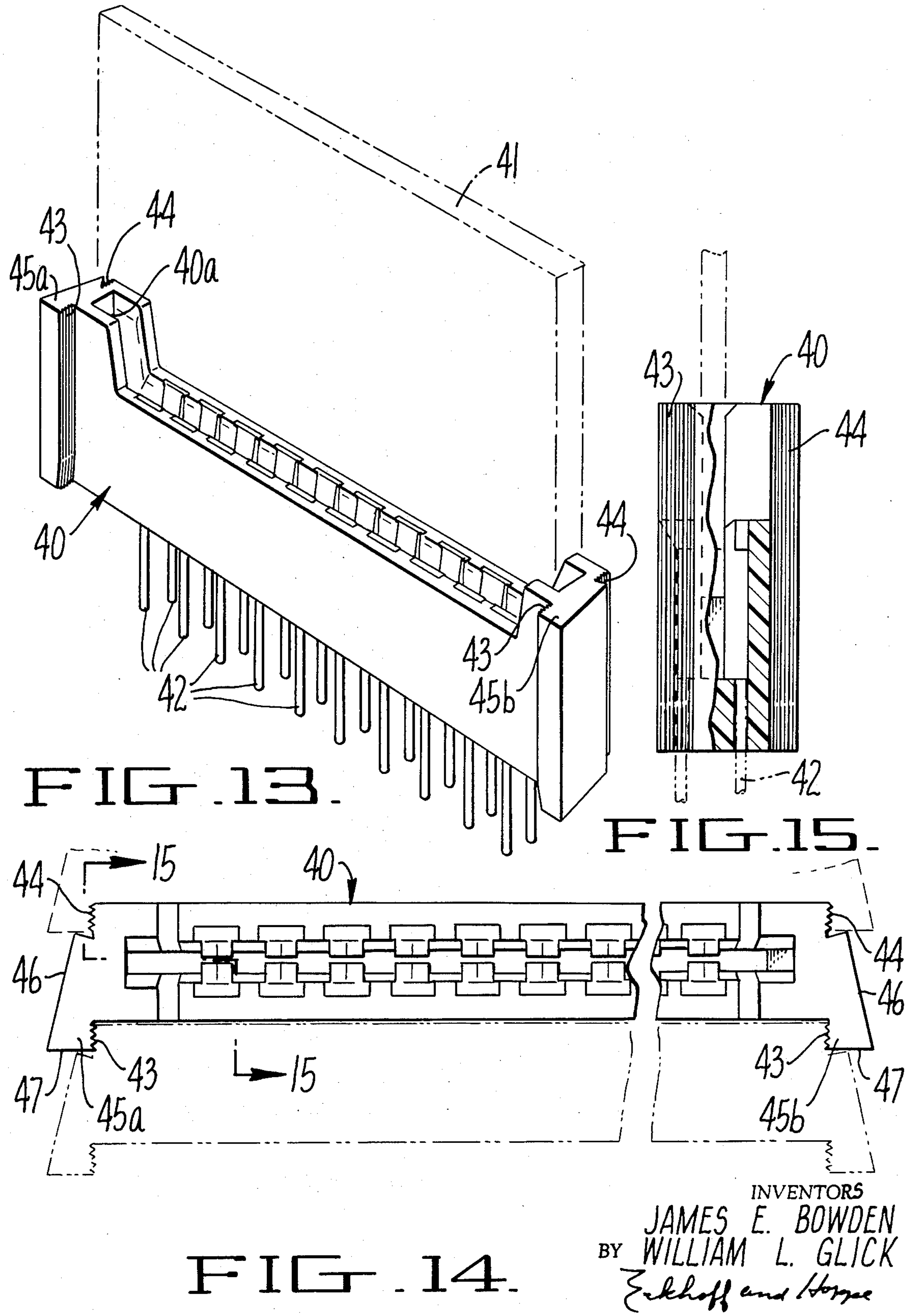

FIGS. 5 and 6 are sections taken on the lines 5—5 and 6—6, respectively, of FIG. 4;

FIG. 7 is a perspective view of flat-pack carrier bodies that embody the invention;

FIG. 8 is an end elevation of the flat-pack carrier body shown in FIG. 7, portions of connecting carrier bodies being indicated with broken lines;

FIG. 9 is a side elevation and partial section taken on the broken line 9—9 of FIG. 8;

FIG. 10 is a perspective view of T O type carrier bodies that embody this invention;

FIG. 11 is a top plan view of the T O carrier body, portions of connecting carrier bodies being indicated with broken lines;

FIG. 12 is a section and partial elevation on the broken line 12—12 of FIG. 11;

FIG. 13 is a perspective view of an edge connector type carrier body that embodies the present invention and is adapted for receiving a ceramic integrated circuit package;

FIG. 14 is a top plan view of the carrier body shown in FIG. 13; and

FIG. 15 is a section and partial elevation taken on the broken line 15—15 of FIG. 14.

Figure 1:
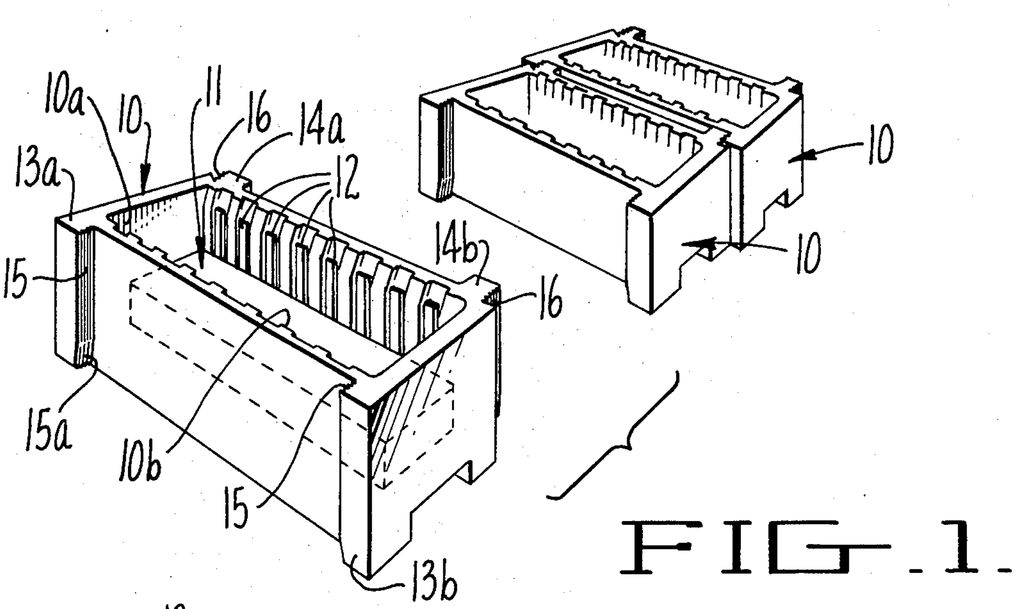
Figures 2, 3:
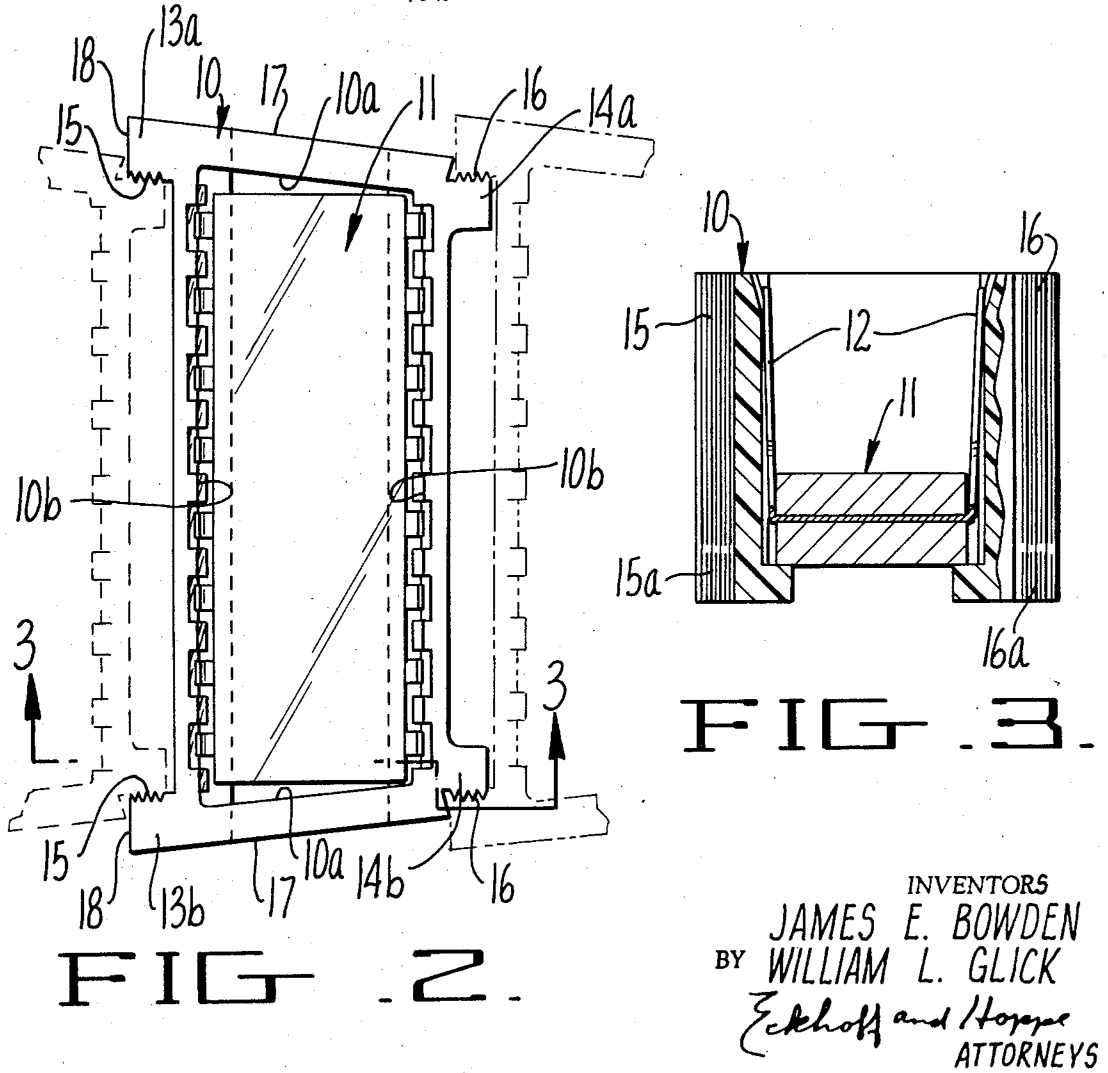
FIG. 2 is a top plan view of one dual in-line carrier body, portions of two identical and connected carrier bodies being indicated with broken lines.
FIG. 3 is a section taken on the broken line 3—3 of FIG. 2.

This invention, as illustrated by the drawings, may be used in connection with carrier bodies of various configurations. First, and referring to FIGS. 1–3, the invention is shown as applied to a dual in-line carrier body 10 having a cavity defined by a pair of convergent or non-parallel side walls **10*a* and parallel side walls 10*b*, said cavity being adapted for receiving an integrated circuit package 11. The inner surface of cavity 10*a* is formed with parallel recesses, each recess receiving one of the leads 12 of circuit package 11** in the conventional manner.

The present invention as applied to carrier body 10 more especially involves providing complementary and interlocking surfaces that allow one carrier body to be assembled to other carrier bodies of similar kind to expedite handling, testing of parts and machine processing. In that regard carrier bodies 10 are integrally formed with a pair of sidewall extensions **13*a* and 13*b*, which project from one side of the carrier body, and a pair of ribs 14*a* and 14*b* which project from the opposite side of the carrier body. Sidewall extensions 13*a* and 13*b* present inwardly facing surfaces 15, each surface being serrated and having a sawtooth profile defined by very small ridge teeth. Ribs 14*a* and 14*b* provide outwardly facing surfaces 16 which complement surfaces 15 and are spaced apart approximately the same distance. More particularly, the spacing between surfaces 15 and 16, as shown in FIG. 4, is set to provide negative clearance or contact when ribs 14*a* and 14*b* of one carrier body are inserted between sidewall extensions 13*a* and 13*b* of a second carrier body. The plastic material from which the carrier bodies are made possess sufficient resiliency and strength to allow sidewall extensions 13*a*, 13*b* and ribs 14*a*, 14*b* to deflect for purposes of engaging surfaces 15 of one carrier body with the surfaces 16 of another carrier body by applying pressure as indicated by the arrows in FIG. 4**.

It is to be understood that the drawings illustrate enlarged views of a typical dual in-line carrier body, these carriers being approximately 1 inch in length and a half inch in width. A preferred embodiment of carrier bodies 10, therefore, utilize serrated surfaces having a sawtooth profile defined by teeth formed on a modulus spacing of approximately 0.0125 inch. Accordingly, very slight deflections are required of the sidewall extensions **13*a*, 13*b* and ribs 14*a*, 14*b*** for purposes of joining one carrier body to another.

FIGS. 5 and 6 illustrate another detail in the construction of surfaces 15 and 16 that facilitate an interlocking engagement of carrier bodies. More particularly, one end portion of surface 15 (the end portion in which each line of serration terminates) is angled outwardly, as indicated by reference number **15*a*. Similarly, end portions of surfaces 16 are angled inwardly, as indicated by reference number 16*a*. A slight angular deviation of 2° extending a length of 0.07 inch has been been found suitable for providing clearance that enhances the assembly of parts. For example, and rather than join the carrier bodies as suggested by the arrows in FIG. 4, two carrier bodies may be joined with less force or practically no force at all by simply aligning the serrated portions 15*a* of one carrier body opposite to the serrated portion 16*a*** of a second carrier body and then sliding the parts together in the direction of the serrations. This feature is particularly useful when the carrier bodies are assembled together by machine.

It will be further noted that carrier bodies 10 are formed with a pair of exterior surfaces 17, each surface extending from a shoulder 18 formed at the end of sidewall extensions 13*a* and 13*b*. Exterior surfaces 17 are inclined inwardly from shoulders 18 at an acute angle relative to the line of the stack formed by an assembly of carrier bodies. Accordingly, shoulders 18 project laterally outward from the stack and each exterior surface 17 provides relief that exposes the shoulder of an attached carrier body. An assembled stack of carrier bodies 10 may then be advanced within a machine by reference to and engagement with exposed shoulders 18.

FIGS. 7–9 illustrate the application of this invention to a flat-pack carrier 20. Referring to FIG. 7, carrier bodies 20 support an integrated circuit package 21 and are assembled one to another by means of complementary inwardly facing surfaces 22 and outwardly facing surfaces 23. Surfaces 22 are formed on sidewall extensions 24*a* and 24*b* while surfaces 23 are formed on the sidewalls 25*a* and 25*b* of the carrier body. In the particular embodiment shown serrations 23 are interrupted by openings 26 through sidewalls 25*a* and 25*b*, this opening providing lateral access to the package 21. The construction details for serrated surfaces 22 and 23 are otherwise the same as those described in connection with surfaces 15 and 16 of the dual in-line carrier body 10. It will be further noted that carrier bodies 20 also possess exterior surfaces 27 which are inclined relative to the plane between a pair of surfaces 22 and 23 on one side of the body, and surfaces 27 expose a pair of shoulders 28 that may be used as a reference or engaged for advancing the carrier body and other bodies attached thereto.

FIGS. 10–12 illustrate carrier bodies 30 for supporting a T O package 31. Carrier bodies 30 provide complementary inwardly facing surfaces 32, formed on sidewall extensions 34*a* and 34*b*, and outwardly facing surfaces 33, located on the opposite side of the carrier body. Exterior sidewall surfaces 35 are angularly inclined relative to a stack of carrier bodies, as shown in FIG. 11, to expose the shoulders 36 of a connected carrier body. Surfaces 32 and 33 are serrated essentially the same as the serrated surfaces described in connection with dual in-line carrier bodies 10.

FIGS. 13–15 illustrate an application of this invention to a carrier body 40 having a slotted cavity for receiving a semicondutor device 41 having a plurality of parallel leads terminating at one edge. Carrier body 40 supports a plurality of terminals 42, one terminal being disposed in a slotted recess of cavity 40*a*. The general arrangement and construction of body 40 is known as an edge connector. Carrier body 40, like other embodiments of the invention herein described, is formed with complementary inwardly facing serrated surfaces 43 and outwardly facing serrated surfaces 44. Surfaces 43 are formed on the sidewall extensions 45*a* and 45*b*, surfaces 44 being formed in recessed edges on the opposite side of the carrier body. Exterior surfaces 46 are inclined relative to the line of the stack as to provide relief and expose the shoulders 47 for purposes already described in connection with other embodiments.

Although preferred embodiments of this invention have been illustrated and described, various modifications and changes may be resorted to without departing from the spirit of the invention or the scope of the attached claims, and each of such modifications and changes is contemplated.

What is claimed is:

1. A carrier body for semi-conductor devices, said body having side walls that define a cavity and recesses for receiving and mounting a semi-conductor device including a plurality of leads, one side of said carrier body being open to said cavity for inserting the semiconductor device and locating the leads in the recesses first and second pairs of spaced surfaces formed on said carrier body for interconnecting one carrier body to another while exposing the recesses and providing access to the leads of a semi-conductor device mounted in said cavity, said first pair of surfaces being inwardly facing, said second pair of surfaces being outwardly facing and spaced apart approximately the same distance as the spacing between inwardly facing surfaces, at least one outwardly facing surface and one inwardly facing surface being formed with parallel serrations of approximately equal spacing, said first and second pairs of surfaces being located on said body such that extensions of such surfaces in at least one direction are non-intersecting relative to other portions of said body and allow the first pair of surfaces of one body to be aligned with the second pair of surfaces on a second body, whereby the second pair of surfaces of one carrier body may be positioned between and engaged with the first pair of surfaces of a second carrier body by end-wise aligning said first pair of surfaces with said second pair of surfaces and sliding said surfaces along one another.

2. The carrier body of claim 1, each serrated surface having a sawtooth profile, each tooth formed on a modulus spacing of approximately 0.0125 inch.

3. The carrier body of claim 1, said body being formed of resilient material as will allow one carrier body to be connected to another by aligning the first pair of surfaces on one body with a second pair of surfaces on a second body, placing one of said first surfaces into engagement with a second surface, and forcing the other second surface into surface engagement with the other first surface.

4. A carrier body for semi-conductor devices, said body having side walls that define a cavity and recesses for receiving and mounting a semi-conductor device including a plurality of leads, one side of said carrier body being open to said cavity for inserting the semiconductor device and locating the leads in the recesses, first and second pairs of spaced surfaces formed on said carrier body for interconnecting one carrier body to another while exposing the recesses and providing access to the leads of a semi-conductor device mounted in said cavity, the first pair of surfaces being spaced apart and complementary to said second pair of surfaces, said first and second pairs of surfaces being located on opposite sides of the body so that the first pair of surfaces of one body may be engaged with the second pair of surfaces of a second body to form a stack in a direction substantially normal to the planes between first and second surfaces, said body having at least one exterior surface that is inclined at an acute angle relative to the direction of the stack, each exteri- or surface providing relief to expose a shoulder on an attached carrier body, whereby the shoulder may be engaged for advancing the body.

5. In combination, a plurality of carrier bodies for semi-conductor devices, each body having side walls that define a cavity and recesses for receiving and mounting a semi-conductor device, including a plurality of leads, one side of each carrier body being open to said cavity for inserting the semi-conductor device and locating the leads in the recesses, each body having a first pair of spaced surfaces on a second side, and a second pair of spaced surfaces on an opposite side, the first pair of surfaces of one body being disconnectably engaged with the second pair of surfaces of another body while exposing the recesses of each carrier body and providing access to the leads of a semi-conductor device mounted in said cavity, each body having at least one exterior surface that is inclined at an acute angle relative to the line of the stack, each exterior surface providing relief to expose a shoulder on an attached carrier body, whereby the shoulder of each body may be engaged for advancing the stack.

* * * * *